United States Patent
Chen

(10) Patent No.: US 7,954,241 B2
(45) Date of Patent: Jun. 7, 2011

(54) SELF-LUBRICATING BEARING AND ITS MANUFACTURING PROCESS

(76) Inventor: Yun-Ju Chen, Jhonghe (TW)

( * ) Notice: Subject to any disclaimer, the term of this patent is extended or adjusted under 35 U.S.C. 154(b) by 1005 days.

(21) Appl. No.: 11/822,292

(22) Filed: Jul. 3, 2007

(65) Prior Publication Data
US 2010/0008609 A1   Jan. 14, 2010

(30) Foreign Application Priority Data
Jul. 4, 2006   (TW) .................................. 95124254

(51) Int. Cl.
*B21C 23/04* (2006.01)
*B21K 1/10* (2006.01)
*B22F 3/24* (2006.01)
*B23P 17/00* (2006.01)
*F16C 32/06* (2006.01)
*F16C 33/02* (2006.01)
*F16C 33/10* (2006.01)

(52) U.S. Cl. ............... 29/898.042; 29/898.04; 29/898.1; 29/898.12; 72/264; 384/115; 384/279; 384/286; 384/291; 419/28

(58) Field of Classification Search ............ 29/898, 29/898.04, 898.041, 898.1, 898.12, 898.042; 72/253.1, 264, 265, 273.5; 384/112, 115, 384/279, 286, 291; 419/23, 28
See application file for complete search history.

(56) References Cited

U.S. PATENT DOCUMENTS

| | | | | |
|---|---|---|---|---|
| 3,293,006 A * | 12/1966 | Bartz | ............ | 428/546 |
| 3,445,148 A * | 5/1969 | Grad et al. | ............ | 384/279 |
| 4,774,749 A * | 10/1988 | Furumura | ............ | 29/898.055 |
| 7,563,030 B2 * | 7/2009 | Hong et al. | ............ | 384/100 |
| 2007/0177833 A1 * | 8/2007 | Egami et al. | ............ | 384/279 |
| 2009/0129963 A1 * | 5/2009 | Shimizu et al. | ............ | 419/23 |

* cited by examiner

*Primary Examiner* — David P Bryant
*Assistant Examiner* — Alexander P Taousakis
(74) *Attorney, Agent, or Firm* — The Weintraub Group, P.L.C.

(57) ABSTRACT

The present invention discloses a self-lubricating bearing, which is a hollow cylindrical body with an axial hole in its center, exhibiting a structure formed by sintering a multiple of spherical alloys particles under microscopy. The self-lubricating bearing has a multiple of pores to receive lubricating oil. Further, the present invention provides a manufacturing process for making self-lubricating bearings.

13 Claims, 3 Drawing Sheets

US 7,954,241 B2

SELF-LUBRICATING BEARING AND ITS MANUFACTURING PROCESS

FIELD OF THE INVENTION

The present invention relates to a self-lubricating bearing, and more particularly to a manufacturing process for making the self-lubricating bearings.

BACKGROUND OF THE INVENTION

To render a transmission device, the shaft of a fan for example, being supported and positioned, a bearing is generally used for the insertion and mounting of the shaft such that the shaft may rotate smoothly. Conventional bearing is in general divided into ball bearing and oil-impregnated bearing, which are described as follows:

(1) Ball bearing assumes a multiple-point contact with shaft through a multiple of balls rolling to form a rolling friction. The advantage of such a contact is low friction coefficient; whereas its disadvantage lies in the fact that when one of the balls in a ball bearing fails, the shaft cannot rotate or rotates un-smoothly so as to produce noises or damage the shaft. In addition, a ball bearing with its complex structure may result in a shortened service life as a result of changing environmental conditions, such as excessive temperature or external stress. Further, a ball bearing consists of a lot of fine components, leading to a higher cost and thus affecting the production cost of the whole transmission device.

(2) The manufacture of an oil-impregnated bearing first goes through a pressing process. Processed metal particles are delivered into the cavity of a precision mold and the upper and lower molds are then compressed to form a specific shape of green body, complement to that of the mold cavity. The green body is then sintered, for example, in a flowing protective atmosphere at an appropriate temperature relative to the melting temperature of its main constituent, two thirds of the copper's melting point for example. After an appropriate duration of time, the particles of the green body are sintered to form a sintered body or semi-finished product with a multiple of dense voids. To impregnate oil into the sintered body, it is placed in a container having liquid lubricant and vacuumed to enable the oil entering into the multiple dense voids within the sintered body so as to form an oil-impregnated bearing.

Since oil-impregnated bearings are inexpensive and thus are used extensively. However, the shortcoming of an oil-impregnated bearing lies in the fact that it assumes a planar contact with a shaft, leading to a sliding friction, which has a higher friction coefficient. Also, the volume of the dense voids is insignificant and thus the amount of oil stored is limited; its heat conductivity is unsatisfactory. Further, high temperature resulted from friction sometimes renders the lubricating oil degraded, causing carbonization and carbon clogging. Dusts and wear debris resulted accumulated so as to reduce the lubrication between bearing and shaft, and heat expansion finally cause the bearing and shaft being stuck.

Thus the application of the conventional bearings has been restricted significantly, and further improvements are needed to achieve low friction coefficient, high wear resistance, enhanced oil storing capacity, and extend the service life of bearings.

SUMMARY OF THE INVENTION

In view of the foregoing shortcomings of the prior art, the inventor of the present invention based on years of experience in the related industry to conduct extensive researches and experiments, and finally invented a self-lubricating bearing and its manufacturing process in accordance with the present invention.

The primary objective of the present invention is to provide a self-lubricating bearing, which is a hollow cylindrical body with an axial hole in its center, exhibiting a structure formed by sintering a multiple of spherical alloys particles with a multiple of pores among them to receive lubricating oil.

Another objective of the present invention is to provide a self-lubricating bearing, wherein the circumference of the bearing is formed to have at least two oil channels, and further the oil channels are V-shape.

A further objective of the present invention is to provide a self-lubricating bearing, wherein the bearing is made of bronze.

Another further objective of the present invention is to provide a manufacturing process for making self-lubricating bearings comprising the following steps: the forming step is to place processed particles of a multiple of alloys evenly to a multiple of round cavities provided in the molding mold made of low heat expansion coefficient material and each center of the cavity is provided with a core bar made of low heat expansion coefficient material so as to form a hollow cylindrical green body; the sintering step is to place the molding mold with a multiple of hollow cylindrical green bodies into a sintering furnace with flowing protective atmosphere, which is then heated below two thirds of the melting temperature of the alloy's main constituent for 10 to 20 minutes, such that the spherical alloy particles can be sintered together and form a sintered body with large pores; the shaping step is to place the hollow cylindrical sintered bodies after cooling down into the cavity of a steel extruding mold and extruded therein to shape the sintered bodies into semi-finished bearings with satisfactory roundness, surface roughness, and concentricity; and the oil-impregnation step is to soak the multiple of the semi-finished bearings into a container filled with liquid lubricant, such that the multiple of pores among the spherical alloy particles absorb lubricant and store it therein, and finally the soaking bearings containing rich oil are retrieved from the container to become self-lubricating bearings.

A further objective of the present invention is provide a manufacturing process for making self-lubricating bearings further comprising a shaking step in which the molding mold is placed in a vibrator and shaken for an appropriate period of time, such that the multiple of spherical alloy particles can intimately contact.

Another further objective of the present invention is to provide a manufacturing process for making self-lubricating bearings, wherein the alloy is bronze, and the bottom of the mold cavity is formed to have a core hole for inserting a core bar made of low heat expansion coefficient material, and the core bar is made of ceramics, wherein the ceramic core rod is made of zirconium.

A further objective of the present invention is to provide a manufacturing process for making self-lubricating bearings, wherein the bottom of the molding mold is connected with a bottom plate, the molding mold and the bottom plate are made of graphite, and the diameter of the spherical alloy particles ranges from 0.02 mm to 0.04 mm.

Another further objective of the present invention is to provide a manufacturing process for making self-lubricating bearings, wherein two thirds of the melting temperature of the alloy's main constituent ranges from 750° C. to 850° C.

A further objective of the present invention is to provide a manufacturing process for making self-lubricating bearings, wherein the shaping step takes place synchronously with extruding process, and at least two vertical oil channels are formed on the circumference of the semi-finished bearing during the shaping step.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

The structure, technical measures and effects of the present invention will now be described in more detail hereinafter with reference to the accompanying drawings that show various embodiments of the invention.

Figure 1:
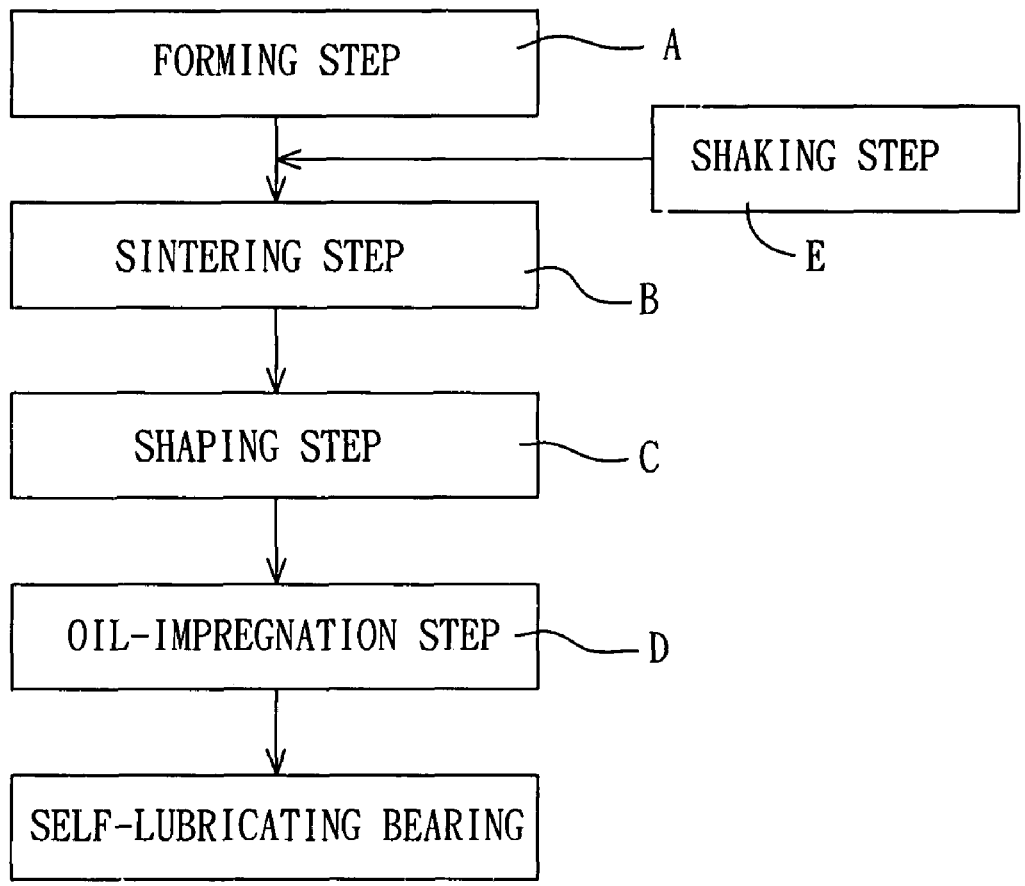
FIG. 1 is a flowchart for a manufacturing process of a self-lubricating bearing of the present invention.

Refer to FIG. 1, the self-lubricating bearing of the present invention is produced through a forming step A, a sintering step B, a shaping step C, and an oil-impregnation step D.

Figure 2:
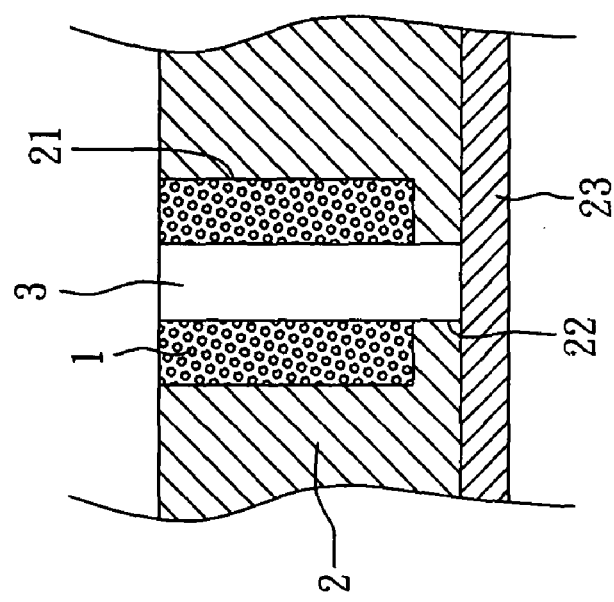
FIG. 2 is a cross-sectional view of a molding mold of the present invention.

The forming step A is to place processed particles a multiple of alloys, wear-resistant spherical bronze participles 1 for example, evenly to the a multiple of round cavities 21 provided in the molding mold 2 which is made of low heat expansion coefficient material shown in FIG. 2. The center of the bottom of the cavity 21 is formed to have a core hole 22 for the insertion of a core bar 3 made of low heat expansion coefficient material, so as to form a hollow cylindrical green body. Further, to prevent the core bar 3 from moving away from its centric position as a result of being mistakenly nudged, the bottom of the molding mold 2 is connected with a bottom plate 23 to avoid mistakenly nudging the core bar 3.

When the spherical alloy particles 1 are placed into the cavities 21, the molding mold 2 is undergoing a shaking step E, in which the molding mold 2 is placed in a conventional vibrator and shaken for an appropriate period of time, such that the multiple of spherical alloy particles 1 can intimately contact. Consequently, the sintered product after the sintering step will not be loose with larger than expected pores.

The diameter of the spherical alloy particles 1 described above is dependent on the size of the shaft of a transmission device. For the use of a cooling fan, the appropriate diameter ranges from 0.02 mm to 0.04 mm. The low-heat-expansion-coefficient material for making the molding mold 2 is graphite when the present invention being implemented. On the other hand, the low-heat-expansion-coefficient core bar 3 is made of ceramics, zirconium oxide for example. The measures taken can prevent the sintered product from having a large tolerance and thus secure the stability of its dimension.

The sintering step B is to place the molding mold 2 with a multiple of hollow cylindrical green bodies into a sintering furnace with protective atmosphere, flowing nitrogen for example. The furnace is then heated to an appropriate temperature relative to the alloy's main constituent of the alloy, 750 to 850° C. which is two thirds of the melting temperature of copper for example, for 10 to 20 minutes, such that the spherical alloy particles can be sintered together and form a sintered body with large pores. Then the molding mold 2 is taken out of the furnace, cooled, and placed upside down to obtain a multiple of hollow cylindrical sintered bodies.

The shaping step C is to place the multiple of hollow cylindrical sintered bodies obtained from the previous step into the cavity of a steel extruding mold and extruded therein to shape the sintered bodies into semi-finished bearings with satisfactory roundness, surface roughness, and concentricity. Also, during the shaping step, the circumference of the semi-finished bearing is formed to have two vertical oil channels, whose function will be described later.

The oil-impregnation step D is to soak the multiple of the semi-finished bearings into a container filled with liquid lubricant, such that the multiple of pores among the spherical alloy particles absorb lubricant and store it therein. Finally, the soaking bearings containing rich oil are retrieved from the container to become self-lubricating bearings, as shown in FIG. 3.

Figure 3:
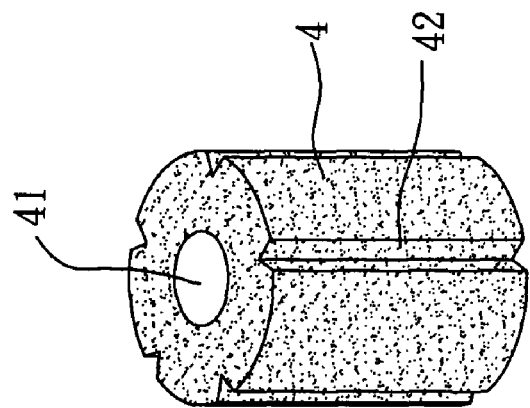
FIG. 3 is a perspective view of a self-lubricating bearing of the present invention.

With reference to FIG. 3, the present invention further provides a self-lubricating bearing 4, which is a hollow cylindrical body and exhibits a structure formed by sintering a multiple of spherical alloys particles under microscopy. The self-lubricating bearing 4 having a multiple of pores to receive lubricating oil is provided with an axial hole 41 for inserting and mounting a transmission device, the shaft 5 of cooling fan for example, and two V-shape oil channels 42 formed on the circumference for the circulation of the lubricating oil.

Figure 4:
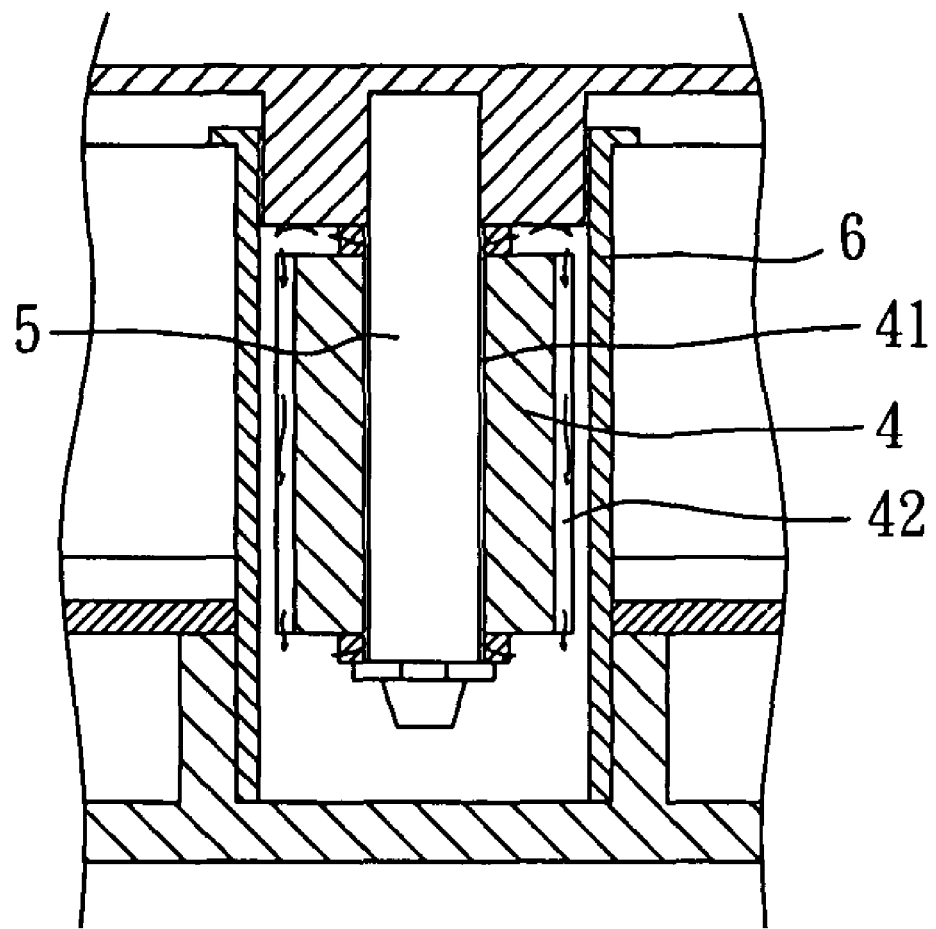
FIG. 4 is a cross-sectional view of a self-lubricating bearing of the present invention assembled with a shaft.

With reference to FIG. 4, the self-lubricating bearing 4 disclosed in the present invention is secured in the sleeve 6 and the shaft of the fan is insertingly mounted into the axial hole 41 of the self-lubricating bearing 4. When the shaft 5 rotates, it assumes point contacts with a multiple of spherical particles in the axial hole 41, leading to a rolling friction therebetween. The temperature of the rolling contact area rises and lubricating oil flows out of the multiple of pores, providing lubricating effect. In the mean time, the centrifugal force generated from the rotation of the shaft 5 draw lubricating oil out of the axial hole 41 to achieve heat dissipation. The lubricating oil is stopped by the stop plate 51 on the circumference of the shaft 5 and accumulated. The oil then flows through the oil channels 42 down to the bottom of the self-lubricating bearing 4 and re-enter into the axial hole 41, which forms a cooling circulation system, greatly reducing the temperature rise as a result of rotating the shaft 5.

With the implementation of the present invention, because the bearing is sintered with spherical particles of a multiple of alloys, a significant amount of a pores exist among the particles, such that the lubricating oil received in the present bearing is one to three times higher than that of a conventional porous bearing made from power metallurgy. Consequently, adequate lubricating and cooling effects can be achieved. Further, sliding friction resulted from point contact occurs between the bearing according to the present invention and the shaft, leading to a small friction coefficient and consequently less wear. Also, the current design of the oil channels formed on the circumference of the present bearing produces an effective cooling circulation for the lubricating oil, whose degradation can be prevented or lessened and which can greatly reduce the heat generated during the rotation of the shaft. Further, when compared with the conventional bearings made from the powder metallurgy process, the present bearing does not require the steps of press forming and vacuum oil-impregnation along with additional advantages, including a larger amount of oil impregnated, smaller friction coefficient, and cooling lubricant circulation. Consequently, the present bearing has a longer service life as well as a lower cost, which is definitely a novel breakthrough of bearing.

The present invention provides a feasible solution, and a patent application is duly filed accordingly. However, it is to be noted that the preferred embodiments disclosed in the specification and the accompanying drawings are not intended to limit the invention. To the contrary, it is intended to cover various modifications and similar arrangements and procedures, and thus the scope of the appended claims should be accorded the broadest interpretation so as to encompass all such modifications and similar arrangements and procedures.

What is claimed is:

1. A manufacturing process for making self-lubricating bearings, comprising the following steps:
    placing processed spherical particles of a multiple of alloys evenly into a multiple of round cavities provided in a molding mold made of low heat expansion coefficient material and each center of each cavity is provided with a core bar made of low heat expansion coefficient material so as to form a hollow cylindrical green body;
    placing the molding mold with a multiple of hollow cylindrical green bodies into a sintering furnace with flowing protective atmosphere, which is then heated below two thirds of the melting temperature of the alloys' main constituent for 10 to 20 minutes, such that the spherical alloy particles can be sintered together and form a sintered body with large pores;
    shaping the hollow cylindrical sintered bodies after cooling down into a cavity of a steel extruding mold and extruded therein to shape the sintered bodies into semi-finished bearings with satisfactory roundness, surface roughness, and concentricity;
    soaking the multiple of the semi-finished bearings in a container filled with liquid lubricant, such that the multiple of pores among the spherical alloy particles absorb lubricant and store it therein, and
    finally retrieving the soaking bearings containing rich oil from the container to become self-lubricating bearings.

2. The manufacturing process for making self-lubricating bearings as claimed in claim 1, further comprising a shaking step in which the molding mold is placed in a vibrator and shaken for an appropriate period of time, such that the multiple of spherical alloy particles can intimately contact.

3. The manufacturing process for making self-lubricating bearings as claimed in claim 1, wherein the alloy is bronze.

4. The manufacturing process for making self-lubricating bearings as claimed in claim 1, wherein the bottom of the mold cavity is formed to have a core hole for inserting a core bar made of low heat expansion coefficient material.

5. The manufacturing process for making self-lubricating bearings as claimed in claim 4, wherein the core bar is made of ceramics.

6. The manufacturing process for making self-lubricating bearings as claimed in claim 5, where the ceramic core bar is made of zirconium.

7. The manufacturing process for making self-lubricating bearings as claimed in claim 1, wherein the core bar is made of ceramics.

8. The manufacturing process for making self-lubricating bearings as claimed in claim 1, wherein bottom of the molding mold is connected with a bottom place.

9. The manufacturing process for making self-lubricating bearings as claimed in claim 8, wherein the molding mold and the bottom plate are made of graphite.

10. The manufacturing process for making self-lubricating bearings of claim 1, wherein the diameter of the spherical alloy particles ranges from 0.02 mm to 0.04 mm.

11. The manufacturing process for making self-lubricating bearings as claimed in claim 1, wherein two thirds of the melting temperature of the alloy's main constituent ranges from 750° C. to 850° C.

12. The manufacturing process for making self-lubricating bearings as claimed in claim 1, wherein the shaping step takes place synchronously with the extruding process, and at least two vertical oil channels are formed on the circumference of the semi-finished bearing during the shaping step.

13. The manufacturing process for making self-lubricating bearings as claimed in claim 1, wherein the protective atmosphere is nitrogen.

* * * * *